US012799305B2

(12) United States Patent
Klotzbach et al.

(10) Patent No.: US 12,799,305 B2
(45) Date of Patent: Nov. 17, 2026

(54) MATTING AGENTS BASED ON PRECIPITATED SILICAS

(71) Applicant: Evonik Operations GmbH, Essen (DE)

(72) Inventors: Thomas Klotzbach, Seligenstadt (DE); Sascha Herrwerth, Freigericht (DE); Andreas Feller, Sulzbach (DE); Siegfried Heeg, Hoesbach (DE); Uwe Schmeier, Hasselroth (DE); Jan Hendrik Heinzinger, Hainburg (DE); Doris Mißelich, Weilerswist (DE)

(73) Assignee: Evonik Operations GmbH, Essen (DE)

( * ) Notice: Subject to any disclaimer, the term of this patent is extended or adjusted under 35 U.S.C. 154(b) by 390 days.

(21) Appl. No.: 18/654,534

(22) Filed: May 3, 2024

(65) Prior Publication Data

US 2024/0368380 A1 Nov. 7, 2024

(30) Foreign Application Priority Data

May 5, 2023 (EP) .................................... 23171810

(51) Int. Cl.
*C08K 9/04* (2006.01)

(52) U.S. Cl.
CPC .......... *C08K 9/04* (2013.01); *C08K 2201/005* (2013.01); *C08K 2201/006* (2013.01)

(58) Field of Classification Search
CPC ................ C08K 9/04; C08K 2201/005; C08K 2201/006; C08K 9/08; C08K 2201/003;
(Continued)

(56) References Cited

U.S. PATENT DOCUMENTS

| | | | |
|---|---|---|---|
| 639,303 | A | 12/1899 | Simon |
| 842,733 | A | 1/1907 | Watson |

(Continued)

FOREIGN PATENT DOCUMENTS

| | | |
|---|---|---|
| DE | 1 006 100 | 4/1957 |
| DE | 1 592 865 | 2/1971 |

(Continued)

OTHER PUBLICATIONS

European Search Report dated Oct. 19, 2023, in European Patent Application No. 23171810.7, 7 pages.

(Continued)

*Primary Examiner* — Pamela H Weiss
(74) *Attorney, Agent, or Firm* — Grüneberg Global IP, PLLC

(57) ABSTRACT

The invention relates to precipitated silica, characterized by

BET: 150 $m^2/g$-400 $m^2/g$, preferably 200 $m^2/g$-300 $m^2/g$, determined to ISO 9277

DOA: 220 ml/100 g-400 ml/100 g, preferably 250 ml/100 g-350 ml/100 g, determined to ISO 19246

$d_{50}$: 3.0 µm-5.0 µm, determined by laser diffraction on a Coulter LS to ISO 13320, particle size ratio $d_5$:$d_{50}$:$d_{95}$: >0.3:1:<2, particle size distribution $$\frac{d_{95}-d_5:}{d_{50}}$$

between 1.3 and 1.7.

15 Claims, 4 Drawing Sheets

(58) Field of Classification Search

CPC .... C08K 3/36; C01P 2006/16; C01P 2006/19; C01P 2006/60; C01P 2004/51; C01P 2004/61; C01P 2006/11; C01P 2006/12; C01P 2006/14; C01P 2006/10; C01P 2006/17; C01P 2006/80; C09C 1/3072; C09C 1/30; C09C 1/3018; C09D 7/61; C09D 7/62; C09D 7/42; C09D 11/03; C09D 11/38; C01B 33/193; C01B 33/12; C01B 33/18; C09K 3/14

See application file for complete search history.

(56) References Cited

U.S. PATENT DOCUMENTS 2,838,413 A 6/1958 Young
4,609,487 A 9/1986 Burkhardt et al.
4,759,665 A 7/1988 Burkhardt et al.
4,877,595 A 10/1989 Klingle et al.
4,950,488 A 8/1990 Schweitzer et al.
5,143,962 A 9/1992 Wolff et al.
5,234,673 A * 8/1993 McGill .................... A61K 8/25 106/287.34
5,342,876 A * 8/1994 Abe ....................... A61Q 11/00 524/493
5,525,563 A 6/1996 Thiele et al.
5,637,715 A 6/1997 Thiele et al.
5,756,778 A 5/1998 Thiele et al.
5,902,783 A 5/1999 Lagnemo et al.
5,919,430 A 7/1999 Hasenzahl et al.
5,959,005 A 9/1999 Hartmann et al.
5,976,480 A 11/1999 Mangold et al.
6,054,112 A 4/2000 Hasenzahl et al.
6,123,762 A 9/2000 Barthel et al.
6,180,076 B1 1/2001 Uhrlandt et al.
6,193,795 B1 2/2001 Nargiello et al.
6,383,280 B1 5/2002 Siray et al.
6,395,247 B1 5/2002 Siray et al.
6,423,331 B1 7/2002 Mangold et al.
6,468,493 B1 * 10/2002 Chevallier ............ C01B 33/193 423/339
6,562,408 B1 5/2003 Costa et al.
6,573,032 B1 6/2003 Preston et al.
6,592,970 B2 7/2003 Ohta et al.
6,610,266 B2 8/2003 Withiam et al.
6,663,963 B2 12/2003 Preston et al.
6,702,887 B2 3/2004 Uhrlandt et al.
6,710,193 B2 3/2004 Hasenzahl et al.
6,720,369 B2 4/2004 Goerl et al.
6,800,267 B2 10/2004 Schubert et al.
6,809,149 B2 10/2004 Meyer et al.
6,849,570 B2 2/2005 Hasenzahl et al.
6,852,300 B2 2/2005 Costa et al.
6,872,402 B2 3/2005 Mangold et al.
6,878,759 B2 4/2005 Goerl et al.
6,899,951 B2 5/2005 Panz et al.
6,902,715 B2 * 6/2005 Maus .................... C01B 33/193 106/287.34
6,921,781 B2 7/2005 Schubert et al.
6,946,119 B2 9/2005 Gallis et al.
6,977,065 B1 12/2005 Esch et al.
6,984,377 B2 1/2006 Withiam et al.
7,008,982 B2 3/2006 Isarov et al.
7,022,375 B2 4/2006 Schachtely et al.
7,071,257 B2 7/2006 Esch et al.
7,097,818 B2 8/2006 Lindner et al.
7,144,930 B2 12/2006 Meyer et al.
7,163,669 B2 1/2007 Withiam et al.
7,201,885 B1 4/2007 Huang et al.
7,204,969 B2 4/2007 Kuhlmann et al.
7,220,449 B2 5/2007 Schachtely et al.
7,255,852 B2 8/2007 Gallis et al.
7,262,233 B2 8/2007 Isarov et al.
7,282,236 B2 10/2007 Michael et al.
7,285,330 B2 10/2007 Meyer et al.
7,297,318 B2 11/2007 Huang et al.
7,303,624 B2 12/2007 Meyer et al.
7,374,787 B2 5/2008 Lortz et al.
7,402,293 B2 7/2008 Meyer et al.
7,438,895 B2 10/2008 Gallis
7,452,600 B2 11/2008 Meyer et al.
7,488,382 B2 2/2009 Schubert et al.
7,488,533 B2 2/2009 Nishi et al.
7,541,014 B2 6/2009 Moerters et al.
7,553,889 B2 6/2009 Christian et al.
7,563,317 B2 7/2009 Meyer et al.
7,566,433 B2 7/2009 Stenzel et al.
7,608,234 B2 10/2009 Stenzel et al.
7,612,137 B2 * 11/2009 Brinkmann ........... C09C 1/3081 106/490
7,628,971 B2 12/2009 Stenzel et al.
7,713,626 B2 5/2010 Meyer et al.
7,722,714 B2 5/2010 Michael et al.
7,767,180 B2 8/2010 Panz et al.
7,790,131 B2 9/2010 Stenzel et al.
7,816,442 B2 10/2010 Christian et al.
7,850,102 B2 12/2010 Meier et al.
7,855,248 B2 12/2010 Stenzel et al.
7,871,588 B2 1/2011 Lindner et al.
7,884,170 B2 2/2011 Magee et al.
7,918,933 B2 4/2011 Lortz et al.
7,923,504 B2 4/2011 Schachtely et al.
7,972,431 B2 7/2011 Meyer et al.
7,981,211 B2 7/2011 Meyer et al.
7,985,292 B2 7/2011 Panz et al.
8,007,751 B2 8/2011 Panz et al.
8,012,253 B2 9/2011 Schubert et al.
8,021,632 B2 9/2011 Baumgarten et al.
8,039,105 B2 10/2011 Meier et al.
8,071,215 B2 12/2011 Meyer et al.
8,075,862 B2 12/2011 Meyer et al.
8,087,450 B2 1/2012 Nycz et al.
8,092,587 B2 1/2012 Zschunke et al.
8,152,916 B2 4/2012 Meyer et al.
8,163,080 B2 4/2012 Meyer et al.
8,209,999 B2 7/2012 Schumacher et al.
8,211,971 B2 7/2012 Meyer et al.
8,211,972 B2 7/2012 Meyer et al.
8,283,040 B2 10/2012 Spyrou et al.
8,293,834 B2 10/2012 Meyer et al.
8,389,617 B2 3/2013 Meyer et al.
8,449,812 B2 5/2013 Hasenzahl et al.
8,480,846 B2 7/2013 Meyer et al.
8,507,033 B2 8/2013 Meyer et al.
8,512,595 B2 8/2013 Meyer et al.
8,545,618 B2 10/2013 Fischer
8,552,107 B2 10/2013 Meyer et al.
8,597,425 B2 12/2013 Stenzel et al.
8,603,353 B2 12/2013 Menzel et al.
8,609,068 B2 12/2013 Hagar et al.
8,614,256 B2 12/2013 Panz et al.
8,617,504 B2 12/2013 Panz et al.
8,658,816 B2 2/2014 Wehmeier et al.
8,722,838 B2 5/2014 Scholz et al.
8,747,541 B2 6/2014 Scharfe et al.
8,829,144 B2 9/2014 Magee et al.
8,835,535 B2 9/2014 Fischer et al.
8,876,965 B2 11/2014 Matthews et al.
8,945,517 B2 2/2015 Hagar et al.
8,962,519 B2 2/2015 Heindl et al.
8,986,442 B2 3/2015 Luginsland et al.
8,993,792 B2 3/2015 Hartung et al.
8,999,053 B2 4/2015 Friedel et al.
9,028,605 B2 5/2015 Hagar et al.
9,051,477 B2 6/2015 Matthews et al.
9,138,385 B2 9/2015 Dahl et al.
9,186,307 B2 11/2015 Gallis et al.
9,221,945 B2 12/2015 Alzer et al.
9,327,988 B2 5/2016 Hagar et al.
9,353,289 B2 5/2016 De Gans et al.
9,382,383 B2 7/2016 Ljesic et al.
9,540,247 B2 1/2017 Stenzel et al.
9,567,229 B2 2/2017 Meyer et al.
9,598,316 B2 3/2017 Friedel et al.

(56) References Cited

U.S. PATENT DOCUMENTS

| | | | |
|---|---|---|---|
| 9,616,007 | B2 | 4/2017 | Herrwerth et al. |
| 9,617,162 | B2 | 4/2017 | Hagar et al. |
| 9,617,389 | B2 | 4/2017 | Magee et al. |
| 9,617,390 | B2 | 4/2017 | Hinzmann et al. |
| 9,663,622 | B2 | 5/2017 | Hinzmann et al. |
| 9,725,326 | B2 | 8/2017 | Lindner et al. |
| 9,738,535 | B2 | 8/2017 | Panz et al. |
| 9,790,327 | B2 | 10/2017 | Klotzbach et al. |
| 9,926,451 | B2 | 3/2018 | Blume et al. |
| 9,994,596 | B2 | 6/2018 | Krafczyk et al. |
| 10,065,865 | B2 | 9/2018 | Fuhrmann et al. |
| 10,125,108 | B2 | 11/2018 | Jahn et al. |
| 10,222,717 | B2 | 3/2019 | Kaneeda et al. |
| 10,280,088 | B2 | 5/2019 | Schulze Isfort et al. |
| 10,287,438 | B2 | 5/2019 | Nassivera et al. |
| 10,287,454 | B2 | 5/2019 | Klotzbach et al. |
| 10,308,820 | B2 | 6/2019 | Duerr et al. |
| 10,328,002 | B2 | 6/2019 | Dolan et al. |
| 10,442,899 | B2 | 10/2019 | Warnshuis et al. |
| 10,589,210 | B2 | 3/2020 | Zhou et al. |
| 10,633,555 | B2 | 4/2020 | Stache et al. |
| 10,752,510 | B2 | 8/2020 | Drexel et al. |
| 10,767,103 | B2 | 9/2020 | Lortz et al. |
| 10,850,261 | B2 | 12/2020 | Nadolny et al. |
| 10,882,027 | B2 | 1/2021 | Nadolny et al. |
| 10,882,028 | B2 | 1/2021 | Nadolny et al. |
| 10,959,922 | B2 | 3/2021 | Nassivera et al. |
| 10,987,664 | B2 | 4/2021 | Reschetilowski et al. |
| 11,161,941 | B2 | 11/2021 | Warnshuis et al. |
| 11,192,794 | B2 | 12/2021 | Schmidt et al. |
| 11,242,259 | B2 | 2/2022 | Schulze Isfort et al. |
| 11,253,844 | B2 | 2/2022 | Nadolny et al. |
| 11,254,819 | B2 | 2/2022 | Hallack et al. |
| 11,267,975 | B2 | 3/2022 | Michael et al. |
| 11,274,043 | B2 | 3/2022 | Li et al. |
| 11,285,088 | B2 | 3/2022 | Hagar et al. |
| 11,352,510 | B2 | 6/2022 | Michael et al. |
| 11,414,621 | B2 | 8/2022 | Heining et al. |
| 11,458,454 | B2 | 10/2022 | Drexel et al. |
| 11,548,788 | B2 | 1/2023 | Cornelius et al. |
| 11,945,951 | B2 | 4/2024 | Schulz et al. |
| 11,958,981 | B2 | 4/2024 | Numrich et al. |
| 11,987,528 | B2 | 5/2024 | Albinus et al. |
| 12,030,810 | B2 | 7/2024 | Geisler et al. |
| 12,037,252 | B2 | 7/2024 | Gallis et al. |
| 2001/0001656 | A1 | 5/2001 | Hasenzahl et al. |
| 2001/0055562 | A1 | 12/2001 | Hasenzahl et al. |
| 2002/0037936 | A1 | 3/2002 | Michael et al. |
| 2002/0055556 | A1 | 5/2002 | Schubert et al. |
| 2002/0061404 | A1 | 5/2002 | Schubert et al. |
| 2002/0077388 | A1 | 6/2002 | Meyer et al. |
| 2002/0077407 | A1 | 6/2002 | Meyer et al. |
| 2002/0091190 | A1 | 7/2002 | Goerl et al. |
| 2002/0102198 | A1 | 8/2002 | Kuhlmann et al. |
| 2002/0150528 | A1 | 10/2002 | Maus et al. |
| 2002/0155256 | A1 | 10/2002 | Ohta et al. |
| 2002/0169248 | A1 | 11/2002 | Esch et al. |
| 2003/0003040 | A1 | 1/2003 | Lindner et al. |
| 2003/0037706 | A1 | 2/2003 | Uhrlandt et al. |
| 2003/0078160 | A1 | 4/2003 | Hasenzahl et al. |
| 2003/0119983 | A1 | 6/2003 | Goerl et al. |
| 2003/0130116 | A1 | 7/2003 | Hasenzahl et al. |
| 2003/0138369 | A1 | 7/2003 | Withiam et al. |
| 2003/0144404 | A1 | 7/2003 | Schachtely et al. |
| 2003/0152771 | A1 | 8/2003 | Preston et al. |
| 2003/0162881 | A1 | 8/2003 | Panz et al. |
| 2003/0180548 | A1 | 9/2003 | Costa et al. |
| 2003/0235597 | A1 | 12/2003 | Withiam et al. |
| 2003/0235624 | A1 | 12/2003 | Mangold et al. |
| 2004/0013616 | A1 | 1/2004 | Withiam et al. |
| 2004/0024070 | A1 | 2/2004 | Michael et al. |
| 2004/0047792 | A1 | 3/2004 | Schubert et al. |
| 2004/0106697 | A1 | 6/2004 | Lortz et al. |
| 2004/0120876 | A1 | 6/2004 | Meyer et al. |
| 2004/0121156 | A1 | 6/2004 | Meyer et al. |
| 2004/0127604 | A1 | 7/2004 | Meyer et al. |
| 2004/0161389 | A1 | 8/2004 | Gallis et al. |
| 2004/0161390 | A1 | 8/2004 | Gallis et al. |
| 2004/0249049 | A1 | 12/2004 | Christian et al. |
| 2004/0253164 | A1 | 12/2004 | Mangold et al. |
| 2005/0069708 | A1 | 3/2005 | Isarov et al. |
| 2005/0113488 | A1 | 5/2005 | Isarov et al. |
| 2005/0124749 | A1 | 6/2005 | Schachtely et al. |
| 2005/0137317 | A1 | 6/2005 | Lindner et al. |
| 2005/0191228 | A1 | 9/2005 | Panz et al. |
| 2005/0192395 | A1 | 9/2005 | Panz et al. |
| 2005/0241531 | A1 | 11/2005 | Meyer et al. |
| 2005/0244642 | A1 | 11/2005 | Meyer et al. |
| 2005/0282934 | A1 | 12/2005 | Brinkmann et al. |
| 2005/0282951 | A1 | 12/2005 | Esch et al. |
| 2006/0093543 | A1 | 5/2006 | Morters et al. |
| 2006/0099129 | A1 | 5/2006 | Stenzel et al. |
| 2006/0100344 | A1 | 5/2006 | Stenzel et al. |
| 2006/0105004 | A1 | 5/2006 | Withiam et al. |
| 2006/0137575 | A1 | 6/2006 | Stenzel et al. |
| 2006/0165581 | A1 | 7/2006 | Stenzel et al. |
| 2006/0254463 | A1 | 11/2006 | Luginsland et al. |
| 2007/0059232 | A1 | 3/2007 | Stenzel et al. |
| 2007/0100057 | A1 | 5/2007 | Stenzel et al. |
| 2007/0107634 | A1 | 5/2007 | Huang et al. |
| 2007/0125269 | A1 | 6/2007 | Nishi |
| 2007/0154412 | A1 | 7/2007 | Phillips et al. |
| 2007/0154413 | A1 | 7/2007 | Phillips et al. |
| 2007/0191537 | A1 | 8/2007 | Meyer et al. |
| 2007/0202030 | A1 | 8/2007 | Michael et al. |
| 2007/0286788 | A1 | 12/2007 | Panz et al. |
| 2007/0299203 | A1 | 12/2007 | Panz et al. |
| 2008/0139756 | A1 | 6/2008 | Christian et al. |
| 2008/0153694 | A1 | 6/2008 | Nishi et al. |
| 2008/0159967 | A1 | 7/2008 | Fultz et al. |
| 2008/0159968 | A1 | 7/2008 | Fultz et al. |
| 2008/0160052 | A1 | 7/2008 | Gallis |
| 2008/0160053 | A1 | 7/2008 | McGill et al. |
| 2008/0173739 | A1 | 7/2008 | Meier et al. |
| 2008/0199384 | A1 | 8/2008 | Lu |
| 2008/0199385 | A1 | 8/2008 | Lu |
| 2008/0202387 | A1 | 8/2008 | Lu |
| 2008/0210844 | A1 | 9/2008 | Nycz et al. |
| 2008/0293871 | A1 | 11/2008 | Stenzel et al. |
| 2008/0300356 | A1 | 12/2008 | Meyer et al. |
| 2009/0076194 | A1 | 3/2009 | Meyer et al. |
| 2009/0101866 | A1 | 4/2009 | Schubert et al. |
| 2009/0120328 | A1 | 5/2009 | Michael et al. |
| 2009/0136672 | A1 | 5/2009 | Panz et al. |
| 2009/0137732 | A1 | 5/2009 | Panz et al. |
| 2009/0205370 | A1 | 8/2009 | Costa et al. |
| 2009/0258968 | A1 | 10/2009 | Meyer et al. |
| 2009/0292097 | A1 | 11/2009 | Scholz et al. |
| 2009/0298982 | A1 | 12/2009 | Meyer et al. |
| 2009/0301345 | A1 | 12/2009 | Mangold et al. |
| 2009/0306326 | A1 | 12/2009 | Magee et al. |
| 2009/0311159 | A1 | 12/2009 | Gray |
| 2010/0003182 | A1 | 1/2010 | Costa et al. |
| 2010/0022694 | A1 | 1/2010 | Meyer et al. |
| 2010/0029818 | A1 | 2/2010 | Schachtely et al. |
| 2010/0063323 | A1 | 3/2010 | Baumgarten et al. |
| 2010/0081763 | A1 | 4/2010 | Meyer et al. |
| 2010/0083584 | A1 | 4/2010 | Kroell et al. |
| 2010/0093884 | A1 | 4/2010 | Spyrou et al. |
| 2010/0105818 | A1 | 4/2010 | Meyer et al. |
| 2010/0107930 | A1 | 5/2010 | Lortz et al. |
| 2010/0126387 | A1 | 5/2010 | Meyer et al. |
| 2010/0152349 | A1 | 6/2010 | Meyer et al. |
| 2010/0152350 | A1 | 6/2010 | Meyer et al. |
| 2010/0168305 | A1 | 7/2010 | Meyer et al. |
| 2010/0178509 | A1 | 7/2010 | Schumacher et al. |
| 2010/0196243 | A1 | 8/2010 | Meyer et al. |
| 2010/0200803 | A1 | 8/2010 | Meyer et al. |
| 2010/0203173 | A1 | 8/2010 | Scheffler et al. |
| 2010/0233059 | A1 | 9/2010 | Meyer et al. |
| 2010/0285317 | A1 | 11/2010 | Meier et al. |
| 2010/0286311 | A1 | 11/2010 | Meyer et al. |
| 2010/0288164 | A1 | 11/2010 | Schubert et al. |
| 2010/0319582 | A1 | 12/2010 | Fischer |

(56) References Cited

U.S. PATENT DOCUMENTS

2010/0324173 A1 12/2010 Fischer et al.
2010/0331177 A1 12/2010 Nishi et al.
2011/0021801 A1 1/2011 Wehmeier et al.
2011/0136919 A1 6/2011 Heindl et al.
2011/0160429 A1 6/2011 Magee et al.
2011/0172343 A1 7/2011 Panz et al.
2011/0179970 A1 7/2011 Zschunke et al.
2011/0184142 A1 7/2011 Magee et al.
2011/0206746 A1 8/2011 Hagar et al.
2011/0236288 A1 9/2011 Panz et al.
2011/0244238 A1 10/2011 Panz et al.
2011/0302849 A1 12/2011 Stenner et al.
2011/0315912 A1 12/2011 Menzel et al.
2012/0006228 A1 1/2012 Scharfe et al.
2012/0029136 A1 2/2012 Lindner et al.
2012/0152151 A1 6/2012 Meyer et al.
2012/0216719 A1 8/2012 Hagar et al.
2012/0220694 A1 8/2012 Meyer et al.
2012/0322893 A1 12/2012 Drexel et al.
2013/0171087 A1 7/2013 Herrwerth et al.
2013/0204021 A1 8/2013 Hartung et al.
2013/0237718 A1 9/2013 Hausmann et al.
2013/0251616 A1 9/2013 Stenzel et al.
2013/0298802 A1 11/2013 Matthews et al.
2014/0042359 A1 2/2014 Fuhrmann et al.
2014/0072634 A1 3/2014 Hagar et al.
2014/0072803 A1 3/2014 Panz et al.
2014/0102334 A1 4/2014 Scholz et al.
2014/0134125 A1 5/2014 Dahl et al.
2014/0140938 A1 5/2014 Gallis et al.
2014/0171578 A1 6/2014 Meyer et al.
2014/0182487 A1 7/2014 Friedel et al.
2014/0271900 A1 9/2014 Sinclair
2014/0330035 A1 11/2014 Ljesic et al.
2014/0374656 A1 12/2014 Friedel et al.
2015/0027344 A1 1/2015 Matthews et al.
2015/0073069 A1 3/2015 De Gans et al.
2015/0086463 A1 3/2015 Hagar et al.
2015/0094419 A1 4/2015 Alzer et al.
2015/0368440 A1 12/2015 Scholz et al.
2016/0038387 A1 2/2016 Gallis et al.
2016/0082415 A1 3/2016 Drexel et al.
2016/0107895 A1 4/2016 Schulze Isfort et al.
2016/0137841 A1 5/2016 Warnshuis et al.
2016/0160081 A1 6/2016 Klotzbach et al.
2016/0185918 A1 6/2016 Hinzmann et al.
2016/0208050 A1 7/2016 Klotzbach et al.
2016/0214865 A1 7/2016 Hagar et al.
2016/0222169 A1 8/2016 Hinzmann et al.
2016/0326373 A1 11/2016 Nassivera et al.
2016/0326374 A1 11/2016 Blume et al.
2017/0087066 A1 3/2017 Nassivera et al.
2017/0105913 A1 4/2017 Sinclair
2017/0144124 A1 5/2017 Nejand et al.
2017/0168409 A1 6/2017 Kaneeda et al.
2017/0210763 A1 7/2017 Krafczyk et al.
2017/0291913 A1 10/2017 Krafczyk et al.
2017/0341009 A1 11/2017 Zhou et al.
2018/0100071 A1 4/2018 Duerr et al.
2018/0134676 A1 5/2018 Jahn et al.
2018/0168958 A1 6/2018 Dolan et al.
2018/0312741 A1 11/2018 Lortz et al.
2019/0048224 A1 2/2019 Stache et al.
2019/0106581 A1 4/2019 Michael et al.
2019/0161355 A1 5/2019 Schulze Isfort et al.
2019/0283003 A1 9/2019 Nadolny et al.
2019/0283004 A1 9/2019 Nadolny et al.
2019/0283005 A1 9/2019 Nadolny et al.
2019/0283006 A1 9/2019 Nadolny et al.
2019/0283014 A1 9/2019 Reschetilowski et al.
2019/0375643 A1 12/2019 Li et al.
2020/0010625 A1 1/2020 Warnshuis et al.
2020/0109056 A1 4/2020 Gallis et al.
2020/0206107 A1 7/2020 Hagar et al.
2021/0024359 A1 1/2021 Cornelius et al.
2021/0102091 A1 4/2021 Albert et al.
2021/0122921 A1 4/2021 Hallack et al.
2021/0163304 A1 6/2021 Schmidt et al.
2021/0206972 A1 7/2021 Schulz et al.
2021/0207056 A1 7/2021 Heining et al.
2021/0269359 A1 9/2021 Geisler et al.
2021/0277260 A1 9/2021 Xu et al.
2021/0292233 A1 9/2021 Numrich et al.
2021/0292238 A1 9/2021 Albinus et al.
2021/0309529 A1 10/2021 Gallis et al.
2021/0387859 A1 12/2021 Schmidt et al.
2022/0009785 A1 1/2022 Costa et al.
2022/0041869 A1 2/2022 Michael et al.
2022/0049362 A1 2/2022 Hallack et al.
2022/0267160 A1 8/2022 Giesseler et al.
2022/0289940 A1 9/2022 Hu et al.
2022/0403238 A1 12/2022 Fischer et al.
2022/0403239 A1 12/2022 Fischer et al.
2023/0002627 A1 1/2023 Lazar et al.
2023/0062574 A1 3/2023 Menzel et al.
2023/0075785 A1 3/2023 Bergman et al.
2023/0264964 A1 8/2023 Thoma et al.
2023/0286814 A1 9/2023 Giesseler et al.
2023/0348285 A1 11/2023 Numrich et al.
2023/0391630 A1 12/2023 Wehmeier et al.
2024/0051835 A1 2/2024 Motl et al.
2024/0116764 A1 4/2024 Giesseler et al.
2024/0158649 A1 5/2024 Lazar et al.

FOREIGN PATENT DOCUMENTS

DE 32 20 393 12/1983
DE 101 22 861 3/2002
DE 10 2006 033 136 1/2008
DE 10 2011 017 783 10/2012
EP 0 008 613 3/1980
EP 0 922 691 6/1999
EP 1 258 456 11/2002
EP 1 258 457 11/2002
EP 3 549 668 10/2019
EP 3 791 852 3/2021
WO 2004/083138 9/2004
WO 2004/083144 9/2004
WO 2007/025793 3/2007
WO 2008/046727 4/2008
WO 2008/071466 6/2008
WO 2008/077673 7/2008
WO 2009/015968 2/2009
WO 2009/030587 3/2009
WO 2009/071467 6/2009
WO 2009/095139 8/2009
WO 2010/022544 3/2010
WO 2012/000741 1/2012
WO 2012/069264 5/2012
WO 2014/037192 3/2014
WO 2014/053363 4/2014
WO 2014/060247 4/2014
WO 2014/146729 9/2014
WO 2014/152736 9/2014
WO 2018/001889 1/2018
WO 2019/011780 1/2019
WO 2019/095364 5/2019
WO 2020/161230 8/2020
WO 2021/069256 4/2021
WO 2021/069351 4/2021
WO 2021/170435 9/2021
WO 2022/069286 4/2022
WO 2022/246657 12/2022
WO 2022/246660 12/2022
WO 2023/025624 3/2023
WO 2023/072666 5/2023
WO 2023/104563 6/2023
WO 2023/117440 6/2023
WO 2023/117446 6/2023

(56) References Cited

FOREIGN PATENT DOCUMENTS

| | | |
|---|---|---|
| WO | 2023/227642 | 11/2023 |
| WO | 2024/100081 | 5/2024 |
| WO | 2024/120909 | 6/2024 |

OTHER PUBLICATIONS

U.S. Appl. No. 06/451,906, filed Dec. 21, 1982, Burkhardt et al.
U.S. Appl. No. 60/029,676, filed Oct. 30, 1996, Roland et al.
U.S. Appl. No. 09/293,949, filed Apr. 19, 1999, 2001/0001656, Hasenzahl et al.
U.S. Appl. No. 12/471,974, filed May 26, 2009, 2009/0301345, Mangold et al.
U.S. Appl. No. 11/194,481, filed Aug. 2, 2005, 2005/0282951, Esch et al.
U.S. Appl. No. 09/740,039, filed Dec. 20, 2000, 2002/0037936, Michael et al.
U.S. Appl. No. 11/741,381, filed Apr. 27, 2007, 2007/0202030, Michael et al.
U.S. Appl. No. 11/320,195, filed Dec. 28, 2005, 2006/0105004, Withiam et al.
U.S. Appl. No. 10/863,348, filed Jun. 9, 2004, 2004/0253164, Mangold et al.
U.S. Appl. No. 12/342,725, filed Dec. 23, 2008, 2009/0101866, Schubert et al.
U.S. Appl. No. 10/523,414, filed Sep. 12, 2005, 2006/0137575, Stenzel et al.
U.S. Appl. No. 10/566,373, filed Jan. 30, 2006, 2008/0153694, Nishi et al.
U.S. Appl. No. 12/728,307, filed Mar. 22, 2010, 2010/0331177, Nishi et al.
U.S. Appl. No. 11/037,118, filed Jan. 19, 2005, 2005/0192395, Panz et al.
U.S. Appl. No. 12/095,840, filed Jun. 2, 2008, 2008/0300356, Meyer et al.
U.S. Appl. No. 11/323,865, filed Dec. 30, 2005, 2007/0154413, Phillips et al.
U.S. Appl. No. 11/323,662, filed Dec. 30, 2005, 2007/0154412, Phillips et al.
U.S. Appl. No. 11/646,122, filed Dec. 27, 2006, 2008/0159968, Fultz et al.
U.S. Appl. No. 11/646,120, filed Dec. 27, 2006, 2008/0159967, Fultz et al.
U.S. Appl. No. 11/916,863, filed Mar. 5, 2008, 2008/0202387, Yuanjian Lu.
U.S. Appl. No. 11/916,663, filed Mar. 6, 2008, 2008/0199384, Yuanjian Lu.
U.S. Appl. No. 11/916,867, filed Mar. 5, 2008, 2008/0199385, Yuanjian Lu.
U.S. Appl. No. 14/138,568, filed Dec. 23, 2013, 2014/0102334, Scholz et al.
U.S. Appl. No. 12/301,744, filed May 21, 2009, 2010/0003182, Costa et al.
U.S. Appl. No. 12/439,176, filed Feb. 27, 2009, 2009/0205370, Costa et al.
U.S. Appl. No. 12/376,128, filed Feb. 3, 2009, 2009/0311159, Ann Gray.
U.S. Appl. No. 13/409,715, filed Mar. 1, 2012, 2012/0152151, Meyer et al.
U.S. Appl. No. 11/646,125, filed Dec. 27, 2006, 2008/0160053, McGill et al.
U.S. Appl. No. 12/522,717, filed Jul. 10, 2009, 2010/0083584, Kroell et al.
U.S. Appl. No. 12/676,373, filed Mar. 4, 2010, 2010/0203173, Scheffler et al.
U.S. Appl. No. 12/670,130, filed Jan. 22, 2010, 2010/0196243, Meyer et al.
U.S. Appl. No. 13/121,754, filed Jun. 8, 2011, 2011/0236288, Panz et al.
U.S. Appl. No. 13/121,751, filed Jun. 8, 2011, 2011/0244238, Panz et al.
U.S. Appl. No. 13/202,512, filed Aug. 19, 2011, 2011/0302849, Stenner et al.
U.S. Appl. No. 13/881,488, filed May 24, 2013, 2013/0237718, Hausmann et al.
U.S. Appl. No. 14/000,954, filed Nov. 27, 2013, 2014/0072803, Panz et al.
U.S. Appl. No. 14/920,951, filed Oct. 23, 2015, 2016/0038387, Gallis et al.
U.S. Appl. No. 14/201,399, filed Mar. 7, 2014, 2014/0271900, Sinclair.
U.S. Appl. No. 15/346,786, filed Nov. 9, 2016, 2017/0105913, Sinclair.
U.S. Appl. No. 15/359,254, filed Nov. 22, 2016, 2017/0144124, Nejand et al.
U.S. Appl. No. 18/004,139, filed Jan. 3, 2023, 2023/0264964, Thoma et al.
U.S. Appl. No. 15/484,689, filed Apr. 11, 2017, 2017/0291913, Krafczyk et al.
U.S. Appl. No. 16/608,316, filed Oct. 25, 2019, 2021/0102091, Albert et al.
U.S. Appl. No. 17/257,445, filed Dec. 31, 2020, 2021/0277260, Xu et al.
U.S. Appl. No. 17/251,334, filed Dec. 11, 2020, 2021/0309529, Gallis et al.
U.S. Appl. No. 17/297,464, filed May 27, 2021, 2022/0009785, Costa et al.
U.S. Appl. No. 17/636,886, filed Feb. 20, 2022, 2022/0289940, Hu et al.
U.S. Appl. No. 17/279,061, filed Mar. 23, 2021, 2021/0387859, Schmidt et al.
U.S. Appl. No. 17/754,777, filed Apr. 12, 2022, 2022/0403238, Fischer et al.
U.S. Appl. No. 17/754,783, filed Apr. 12, 2022, 2022/0403239, Fischer et al.
U.S. Appl. No. 17/792,400, filed Jul. 13, 2022, 2023/0002627, Lazar et al.
U.S. Appl. No. 17/792,471, filed Jul. 13, 2022, 2023/0062574, Menzel et al.
U.S. Appl. No. 17/760,456, filed Aug. 10, 2022, 2023/0075785, Bergman et al.
U.S. Appl. No. 17/927,040, filed Nov. 22, 2022, 2023/0286814, Giesseler et al.
U.S. Appl. No. 18/250,405, filed Apr. 25, 2023, 2023/0391630, Wehmeier et al.
U.S. Appl. No. 17/922,203, filed Oct. 28, 2022, 2023/0348285, Numrich et al.
U.S. Appl. No. 17/667,727, filed Feb. 9, 2022, 2022/0267160, Giesseler et al.
U.S. Appl. No. 17/399,171, filed Aug. 11, 2021, 2022/0049362, Hallack et al.
U.S. Appl. No. 18/264,963, filed Aug. 10, 2023, 2024/0051835, Motl et al.
U.S. Appl. No. 18/276,592, filed Aug. 9, 2023, 2024/0116764, Giesseler et al.
U.S. Appl. No. 18/509,122, filed Nov. 14, 2023, 2024/0158649, Lazar et al.

* cited by examiner

K1
d50 = 4.3 μm
15 μm

K2
d50 = 4.0 μm
15 μm

VG1
$d_{50}$ = 3.8 µm
18 µm

VG2
$d_{50}$ = 4.3 µm
18 µm

MATTING AGENTS BASED ON PRECIPITATED SILICAS

CROSS-REFERENCE TO RELATED APPLICATIONS

This patent application is based on and claims priority pursuant to 35 U.S.C. § 119 to European Patent Application No. 23171810.7, filed on May 5, 2023. The content of this application is hereby incorporated by reference in its entirety.

BACKGROUND

Field of the Invention

The present invention relates to matting agents based on precipitated silicas, to the production thereof and to the use thereof in paints and coatings.

Coatings are applied to surfaces or substrates for decorative, functional or protective purposes. They decorate, protect and preserve materials such as wood, metal or plastic. The coatings may be highly glossy or matt.

Description of Related Art

It used to be the case that coatings such as paints and printing inks were matted subsequently by controlled roughening of the surfaces in the microscale range. As a result, the light incident on the roughened surface is not reflected in a directed manner, but scattered diffusely. The more diffusely the light is scattered, the more matt the appearance of the surface to the human eye.

Nowadays, matting agents are used, which are incorporated into paint systems. Matting agents typically consist of precipitated or fumed silicas, silica gels, polymethylureas or waxes. They are subject to many demands. Accordingly, on the one hand, a good matting effect is required; on the other hand, they should not have an adverse effect on the tactile properties of the paint film surfaces and/or the transparency. In addition, they should have good dispersibility in paint production.

It should be possible to give the paint film surfaces a silky matt to dull matt appearance at various levels of matting, but without looking rough. Accordingly, the roughness of matt surfaces is also determined by the particle size and shape of the matting agent. In the case of coarse matting agents, paint film surfaces look matt but rough.

The matting agent is based on the effect of silica particles that project out of the surface, which form a microstructure as the paint system dries. The rays of light are scattered in all directions at the resultant peaks and valleys. A method that has become established for quantification of the degree of mattness/gloss is the measurement of the reflected light component at an angle of 60°.

Coarse particles are fundamentally more easily dispersible than finely divided particles, since a much higher surface area has to be wetted in the case of fine particles. Moreover, fine particles have a much stronger tendency to reagglomerate because of the high surface energy.

For avoidance or reduction of this tendency, which is particularly important in paint production, it would be desirable to provide matting agents where it is possible to reduce the amount thereof used as the gloss level stays the same without adversely affecting transparency, dispersibility and/or tactile properties.

SUMMARY OF THE INVENTION

The present invention therefore provides precipitated silicas characterized by the following physicochemical parameters:

$$BET\text{: } 150\ \text{m}^2/\text{g} - 400\ \text{m}^2/\text{g},$$

$$\text{preferably } 200\ \text{m}^2/\text{g}-300\ \text{m}^2/\text{g}, \text{ measured to } ISO\ 9277$$

$$DOA\text{: } 220\ \text{ml}/100\ \text{g} - 400\ \text{ml}/100\ \text{g},$$

$$\text{preferably } 250\ \text{ml}/100\ \text{g} - 350\ \text{ml}/100\ \text{g}, \text{ determined to } ISO\ 19246$$

$$d_{50}\text{: } 3.0\ \mu\text{m} - 5.0\ \mu\text{m},$$

$$\text{determined by laser diffraction on a Coulter } LS \text{ to } ISO\ 13320,$$

$$\text{particle size ratio } d_5{:}d_{50}{:}d_{95}\text{: } > 0.3{:}1{:}<2,$$

$$\text{particle size distribution } \frac{d_{95}-d_5}{d_{50}}\text{: between 1.3 and 1.7.}$$

A median particle size of the precipitated silica according to the invention can be determined to ISO 13320:2009 by laser diffraction particle size analysis. The resulting measured particle size distribution is used to define the median $d_{50}$, which reflects the particle size not exceeded by 50% of all particles, as the average particle size.

The specific surface area, also referred to simply as BET surface area, is determined to DIN 9277:2014 by nitrogen adsorption in accordance with the Brunauer-Emmett-Teller method.

The DOA absorption value is determined by means of a absorptometer equipped with a torque measurement and processing system. It can be used to assess the liquid absorption capacity of silicon dioxide, calcium silicate and sodium aluminosilicates. The daily absorption value gives a pointer to the carrier capacity of a filler.

Experience has shown that a great amount of precipitated silica with smaller particle sizes is required than in the case of precipitated silicas having larger particle sizes for achievement of the same gloss level.

It has been found that, unexpectedly, it was possible to reduce the amount of the precipitated silica according to the invention used by comparison with a commercial finely divided matting agent. For example, it was possible to reduce the amount used in various paint systems over a broad range of gloss levels, measured at an angle of 60°. Reference is made here to the examples.

The reduced use amount of the precipitated silica according to the invention also constitutes an important product property with regard to efficiency (economic viability). The more efficient a silica, the less has to be used in the corresponding paint system to achieve a defined gloss level.

In addition, it has been established that it was possible to increase the transparency of clearcoats. The density Dy (transparency) of the matted clearcoats was measured with an eXact densitometer from X-Rite, in accordance with DIN 55988. The matted clearcoats in the different paint systems were applied here to black PMMA sheets, with comparison of the various matting agents by adjustment of the gloss levels always to the same gloss level considered in the particular case, measured at 60°. Transparency is then ascertained by the diffuse reflection at an angle of 45° via a logarithmic calculation. The parameters for the measurement were set as follows:

| Parameter | Settings |
|---|---|
| Measuring conditions | M0 (no): no filter |
| Density Status | ISO Status E |
| Density White Base | Absolute |
| All Densities | CMYK |
| Density/Tone Value | Solid: CMYK |
| Density/Tone Value | Tint: Tone Value |
| Tone Value/Spot | SCTV (ISO20654) |
| Illuminant/Observer | D65/2°/10° |

It should be noted here that the transparencies of the matted clearcoat systems can be compared with one another only when the gloss level is the same. Comparison with equal dosage of the silica is impermissible. The measured transparency value Dy is a logarithmic numerical value. Thus, the higher the Dy value, the more transparent the matted clearcoat.

DETAILED DESCRIPTION OF THE INVENTION

The median pore diameter of the precipitated silica according to the invention is preferably less than 7.0 μm, preferably less than 5.0 μm and more preferably less than 3.0 μm, measured with an Autopore IV 9520 to ISO 15901-1, with the following instrument settings: contact angle of 140° and pressure range of 0.003-420 MPa, and determined in the pore diameter range of 3.5 nm-500 μm, determined after the grinding of the silica.

The silica according to the invention preferably has a unique morphology, especially the porosity thereof, which can be illustrated by mercury porosimetry.

The precipitated silica according to the invention preferably has a pore volume of 2.20 ml/g Hg (d=0.1 μm–d=3.0 μm)–2.90 ml/g Hg (d=0.1 μm–d=3.0 μm), determined by means of the Hg porosimeter.

The precipitated silica according to the invention preferably has a pore volume of 2.40 ml/g Hg (d=0.1 μm–d=4.0 μm)–3.10 ml/g Hg (d=0.1 μm–d=4.0 μm), determined by means of the Hg porosimeter.

The precipitated silica according to the invention preferably has a pore volume of 2.50 ml/g Hg (d=0.1 μm–d=5.0 μm)–3.30 ml/g Hg (d=0.1 μm–d=5.0 μm), determined by means of the Hg porosimeter.

The determination of the Hg pore diameter (d<4 μm or d<5 μm) is based on mercury intrusion according to DIN 66133, and an AutoPore V 9600 instrument from Micromeritics is used. The process principle is based on the measurement of the volume of mercury injected into a porous solid as a function of the pressure applied.

Figure 4:
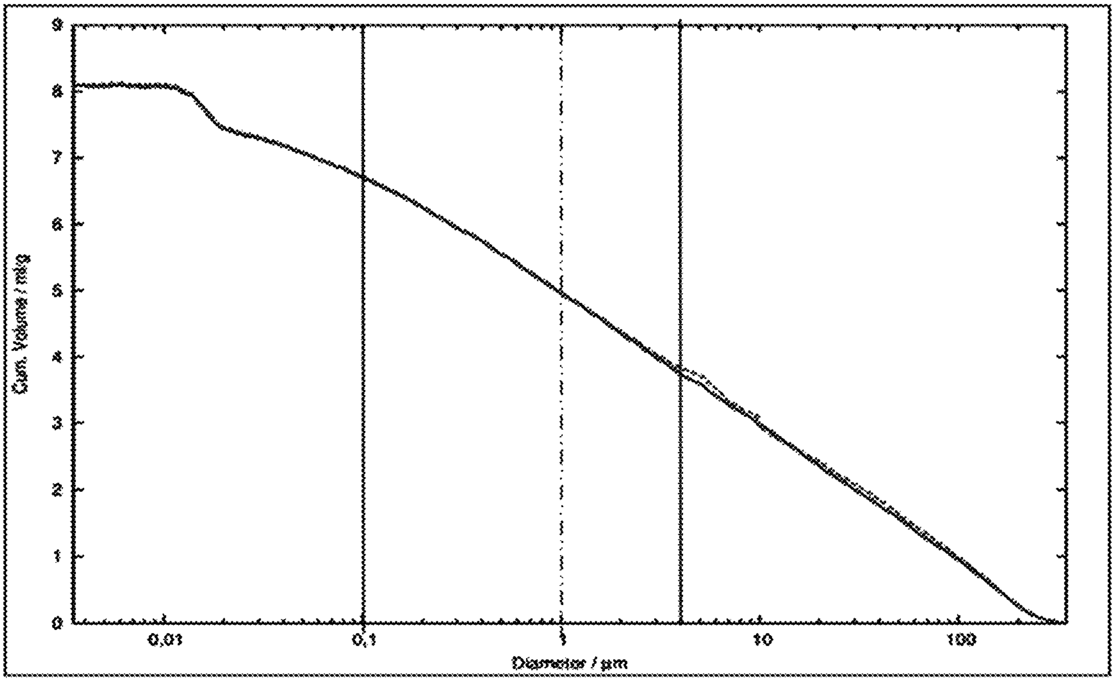
FIG. 4 shows a graph of a determination of pore volume by means of the Hg porosimeter.

FIG. 4 shows a graph of a determination of pore volume by means of the Hg porosimeter. It illustrates, for example, the unique morphology of the inventive silica K2. The vertical lines at d=0.1 μm and d=4.0 μm represent a region nominated for the invention. The difference in the accumulated pore volumes (ml/g) represents the pore volume for this region (see Table C). For the calculation, the points of intersection of the respective vertical lines with the graph are each read off and calculated.

It can additionally be inferred from the graph that, in a region up to a pore diameter of d<1 μm, the cumulated pore volume is 4.9 ml/g. For this purpose, a vertical dotted line is set at d=1 μm. The value at the point of intersection with the graph can be read off. In the case of a pore volume of less than 4.9 ml/g, the graph would have a flatter progression, and as a result the silica particles would have a smaller pore volume.

The silicas according to the invention have a very much smaller average pore diameter than comparable commercial silicas that are used as matting agents. In spite of the much smaller pore diameter, it has been found that they can absorb more mercury. The higher number of smaller pores on average brings a crucial advantage in terms of transparency, especially in the case of waterborne paint systems.

Figure 1:
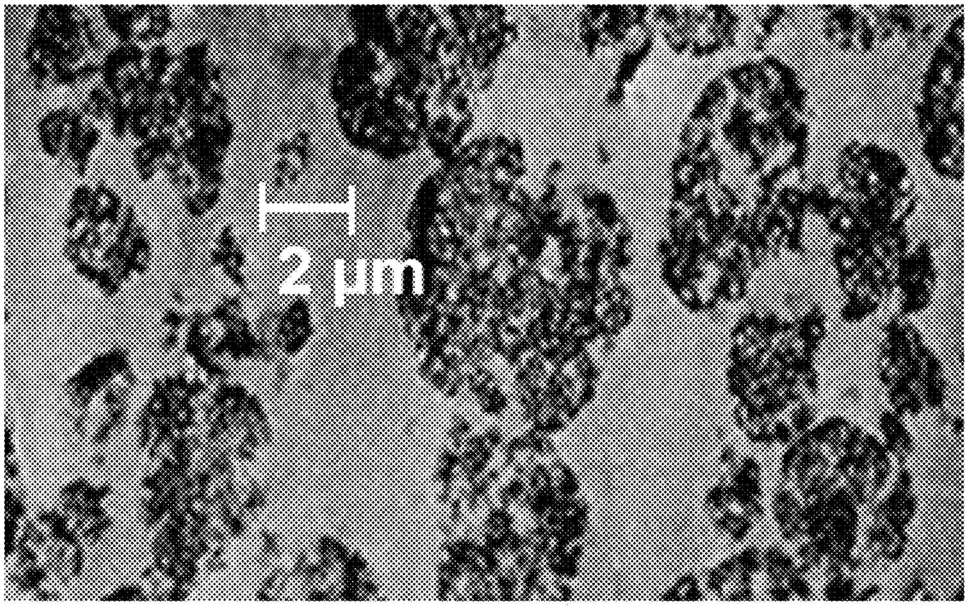
FIG. 1 shows an SEM image of a clearcoat coating in cross section, incorporating the silica particles.

FIG. 1 shows an SEM image of a clearcoat coating in cross section, incorporating the silica particles. Because of the morphology or porosity of the silicas, they behave like a sponge and are filled throughout with the transparent binder. Since the binder and silica have a similar refractive index, the matted clearcoat still remains largely transparent after drying.

Aqueous binders are dispersions of polymer particles in an aqueous phase. The diameter of the spherical polymer particles may be between a few tens of nanometres and a few micrometres. As the paint film dries, water and any cosolvents evaporate, which reduces the volume, and the dispersion begins to coagulate. The dispersion particles come ever closer to one another and ultimately begin to fuse, which can be referred to as coalescence. At the end of the coalescence, a homogeneous binder film is formed, in which the particle boundaries of the binder have disappeared. The binder particles can penetrate efficiently into the many pores and form films in the pores. The more pores are present, the greater the blurring of the differences in refractive index between silica and binder, which leads to improved transparency, which has been found in the case of the silicas according to the invention in the corresponding binder systems.

Figure 2:
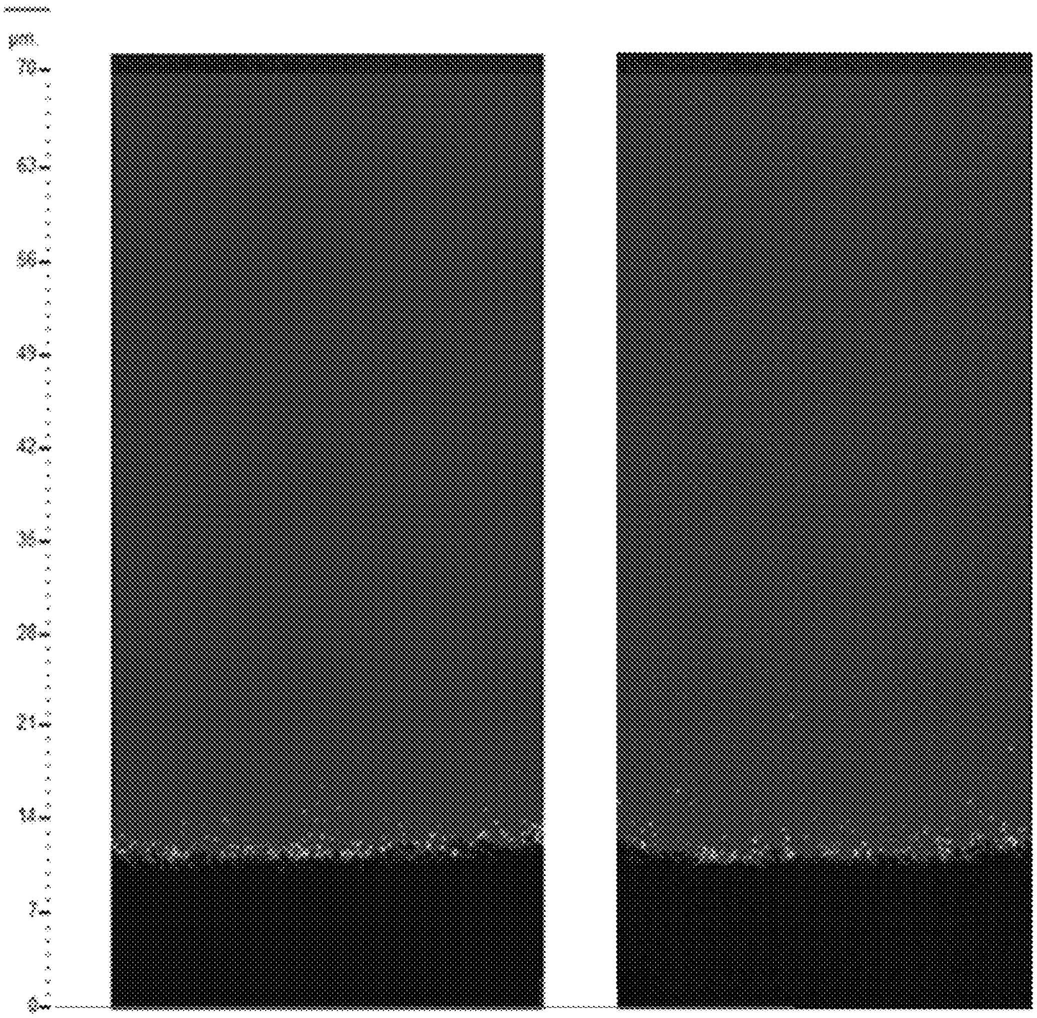
FIG. 2 shows a grindometer image of K1 and K2.
Figure 3:
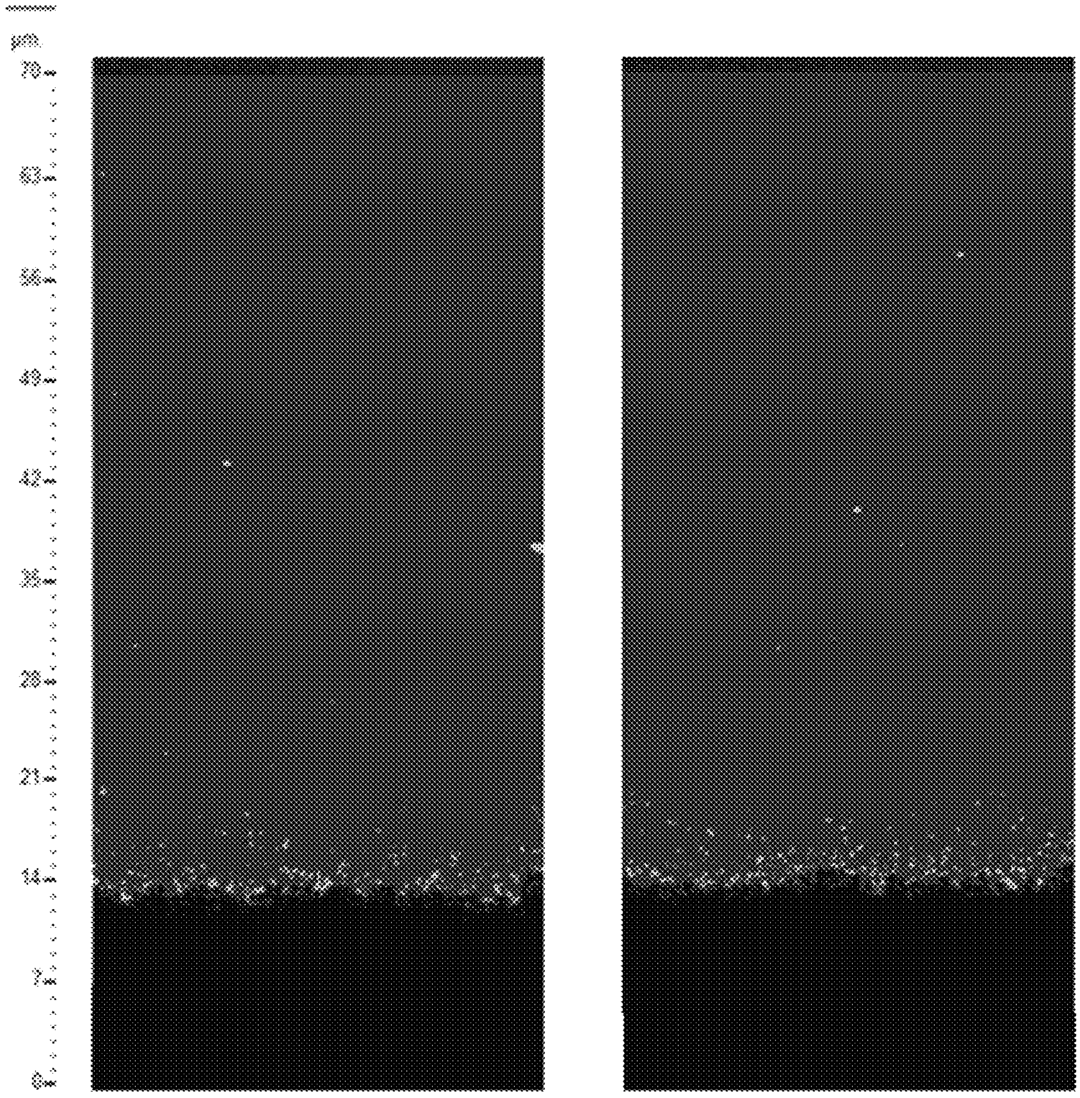
FIG. 3 shows a grindometer image of VG1 and VG2.

The dispersibility of the precipitated silica according to the invention in various paint systems has also been surprisingly improved. A grindometer can be used to indirectly determine dispersibility. Determination by grindometer is in accordance with DIN EN ISO 1524. It can be correlated with speck formation in the dry paint films, such that the unwanted specks or oversize can be recognized with the aid of the grindometer. Moreover, it is also possible via this method to recognize the tendency of a precipitated silica to reagglomerate, which often increases with decreasing particle size distribution. Reference is made here to FIGS. 2 and 3.

In the case of many precipitated silicas with d50 values of less than 5 μm, the silica particles have a tendency to reagglomerate during storage, which can be recognized by an increasing number of specks in the grindometer image over time. Usually, the tendency of untreated silicas to be reagglomerated higher than in the case of those having organic coverage of the surface. This may already be the case after a few days in the case of silicas having a high tendency to reagglomerate, or only after weeks or months in the case of higher stability. In the case of the silicas according to the invention, by contrast, this was not observed, and hence confirms the very low tendency to speck formation. Without being tied to any theory, it is assumed that the specific morphology and pore distribution of the silica according to the invention not only have an advantageous effect on dispersibility, but also result in high stability to reagglomeration.

Tamped densities of various pulverulent or coarse-grain granular materials can be determined according to DIN ISO 787-11:1995 "General methods of test for pigments and extenders—Part 11: Determination of tamped volume and apparent density after tamping". This involves measuring the bulk density of a bulk material after agitation and tamping.

For uniform matting action, the aim is a very narrow particle size distribution. Particle size distribution can be determined in a simple manner, for example by measurements of the d5, d50 and d95 values. Untreated or wax-coated precipitated silicas in accordance with the invention therefore have a particle size distribution (span), defined by the quotient (d95–d5):d50, between 1.3 and 1.7.

A further property is also the particle size ratio of $d_5$:$d_{50}$:$d_{95}$.

The precipitated silica according to the invention preferably has a $d_{50}$ of 3.5-4.5 µm.

As well as the untreated hydrophilic silicas, the use of wax-coated silicas as matting agents is also known. Such a wax treatment distinctly improves the sedimentation characteristics of the precipitated silicas.

The present invention therefore further provides wax-coated precipitated silicas, characterized by $$BET\text{: } 150\ m^2/g - 400\ m^2/g,$$

$$\text{preferably } 200\ m^2/g\text{–}300\ m^2/g\text{, determined to } ISO\ 9277$$

$$DOA\text{: } 220\ ml/100\ g - 400\ ml/100\ g,$$

$$\text{preferably } 250\ ml/100\ g - 350\ ml/100\ g\text{, determined to } ISO\ 19246$$

$$d_{50}\text{: } 3.0\ \mu m - 5.0\ \mu m,$$

$$\text{determined by laser diffraction (Coulter } LS\text{) to } ISO\ 13320,$$

$$\text{particle size ratio } d_5{:}d_{50}{:}d_{95}\text{: } >0.3{:}1{:}<2,$$

$$\text{particle size distribution } \frac{d_{95}-d_5}{d_{50}}\text{: between 1.3 and 1.7.}$$

$$\text{carbon content: } 1.0 - 6.0\% \text{ by weight, preferably } 2.4 - 3.8\% \text{ by weight,}$$

$$\text{determined by } LECO \text{ to } ISO\ 3262 - 19.$$

The procedure for production of the precipitated silicas according to the invention was, for example, as follows.

A precipitation vessel was initially charged with 13.5 $m^3$ of water at a temperature of 50 °C with continuous stirring, to which commercial waterglass was added at a rate of 14.85 $m^3$/h, and the addition was ended after 10-15 min. Subsequently, the mixture is heated to a temperature of 70 °C. Then 96% sulfuric acid is added at 0.27 $m^3$/h within 25-35 min and sheared and stirred constantly, keeping the temperature at 85 °C by closed-loop control. After a period of time between 1.5 h-3.5 h, the suspension is acidified with sulfuric acid within 50-80 min until the pH is within the range of 3.5 to 3.9.

The solids can be separated from the suspension by known filter operations, for example a filter press (membrane filter press). The filtercake washed with demineralized water should then be subjected to drying. For this purpose, many kinds of drying methods are known to the person skilled in the art (Ullmann's Encyclopedia of industrial chemistry, 1992, 5th Edition, vol. B1, pages 7-25). Advantageous drying operations have been found to be those by means of flow dryers, spray dryers, staged dryers, belt dryers, rotary tube dryers, spin-flash dryers or nozzle towers. The drying is more preferably effected by spray dryer or staged dryer.

For the drying by spray dryer, the filtercake is liquefied with water under the action of shear forces and adjusted to a solids content of <15%, preferably 7.0-14.0%, more preferably 9-12%.

The precipitated silica obtained after drying can either be subjected to direct classifying grinding, or it is also possible to simultaneously coat the silica according to the invention with wax during the classifying grinding, in which case coating with 2-15% by weight, preferably with 5-10% by weight and more preferably with 3-6% by weight has been found to be useful.

As well as the wax impregnation of silicas mentioned, other methods are also known for this purpose and can be read about, for example, in DE 1006 100, DE1592 865 or EP 0922 691.

Wax suspensions are reacted here with the silica suspension, optionally mediated by a disperser.

In order to obtain the desired narrow particle distribution of the precipitated silica and the desired $d_{50}$ of 3.0-5.0 µm, a classifying grinding operation was conducted with a conventional air jet mill, e.g. Netzsch CGS 50.

The untreated or wax-coated precipitated silicas according to the invention may be used as matting agents in paints or coatings. In particular, they can be used for production of dispersions, millbases, paints, coatings or printing inks, inkjet inks, grind resins, pigment concentrates, colour preparations, pigment preparations, filler preparations or coating compositions.

The examples that follow are intended to further elucidate the invention, but not to restrict the scope of protection as set out in the description herein:

Methods

Tamped density [g/l] was determined to DIN ISO 787-11:1995.

Specific BET surface area [$m^2$/g] was determined to DIN 9277:2014 by nitrogen adsorption by the Brunauer-Emmett-Teller method.

The DOA absorption value is determined in accordance with ISO 19246 by means of an absorptometer, from Brabender, equipped with a torque measurement and processing system. It can be used to assess the liquid absorption capacity of silicon dioxide, calcium silicate and sodium aluminosilicates. The daily absorption value gives a pointer to the carrier capacity of a filler.

The density Dy (transparency) of the matted clearcoats was measured with an eXact densitometer from X-Rite, in accordance with DIN 55988. The matted clearcoats in the different paint systems were applied here to black PMMA sheets, with comparison of the various matting agents by adjustment of the adjustment of the gloss levels always to the same gloss level considered in the particular case, measured at 60°. Transparency is then ascertained by a diffuse reflection at an angle of 45° via a logarithmic calculation. The parameters for the measurement were set as follows:

| Parameter | Settings |
|---|---|
| Measuring conditions | M0 (no): no filter |
| Density Status | ISO Status E |
| Density White Base | Absolute |
| All Densities | CMYK |
| Density/Tone Value | Solid: CMYK |
| Density/Tone Value | Tint: Tone Value |
| Tone Value/Spot | SCTV (ISO20654) |
| Illuminant/Observer | D65/2°/10° |

Determination by grindometer is in accordance with DIN EN ISO 1524.

A black melamine baking lacquer and a TIDAS instrument for automatic grindometer drawdowns for the determination of dispersion fineness from Labman were used to assess the dispersion characteristics of the various matting agents.

In order to create the grindometer images shown in FIGS. 2 and 3, the black medium-solids baking lacquer from AXALTA Coating Systems Austria GmbH, named DUPLEX D 1326, formulation number B11830875, was used with the appropriate V 0003 thinner (from Axalta). The appropriate amount of the precipitated silica which is required to adjust the gloss level of the dry paint layer to 20 GU, measured at a 60° angle, is stirred here into 100 g of paint with a paddle stirrer at 2000 rpm for 10 minutes. The paint is then applied in liquid form to the grindometer block with a maximum channel depth of 70 μm and automatically applied by knife-coating and evaluated with the TIDAS instrument.

Carbon content [% by weight] was determined to EN ISO3262-20:2000 (Chapter 8) by elemental analysis with the C632 carbon determination system (manufacturer: LECO). The sample analysed was weighed into a ceramic crucible, admixed with combustion additives and heated under an oxygen stream in an induction oven. The carbon present is oxidized to CO2. The amount of CO2 gas is quantified by infrared detectors (IR). SiC, if present, is not combusted and therefore does not affect the carbon content value.

Determination of Hg pore volume (d<4 μm, d<5 μm) is based on mercury intrusion according to DIN 15901-1, using an AutoPore V 9520 instrument from Micromeritics with the following device settings: contact angle of 140° and pressure range of 0.003-420 MPa, and in the pore diameter range of 3.5 nm-500 μm, after the grinding of the silica.

EXAMPLES

1. Production of the Inventive Precipitated Silicas K1 and K2

A 20 $m^3$ precipitation vessel was initially charged with 13.5 $m^3$ of water at a temperature of 50 °C with continuous stirring, to which commercial waterglass (27.1% SiO2; 8.07% $Na_2O$; density 1.335) was added at a rate of 14.85 $m^3/h$, and the addition was ended after 13 min. Subsequently, the mixture was heated to a temperature of 70 °C. Then 96% sulfuric acid was added at 0.27 $m^3/h$ within 30 min and sheared and stirred constantly, keeping the temperature at 85 °C by closed-loop control. After a period of time of 120 min, the suspension was acidified again with sulfuric acid within 60 min, until the pH reached a value in the range of 3.5 to 3.9. The solids were separated from the suspension using a membrane filter press, and the filtercake was washed with demineralized water and then dried with a spray dryer. For the drying by spray dryer, the filtercake was liquefied with water under the action of shear forces and adjusted to a solids content of 10%.

The dried precipitated silica according to the invention was classified and ground with the aid of a Netzsch CGS 50 air-jet mill in accordance with the desired grain distribution.

K1 is an untreated silica according to the invention having the physicochemical properties according to Tables A-C.

K2 was produced analogously, with surface coverage of K2 with a commercial PE wax during the classifying and grinding in the mill, with adjustment of the amount of wax to a carbon content of 3.4%, measured with a LECO elemental analyser. The physicochemical indices of K2 are likewise apparent from Tables A-C.

The comparative examples cited were the commercial precipitated silicas from Tosoh.

TABLE A

| Silica | Manufacturer | Surface | BET [$m^2/g$] | DOA absorption, [ml/100 g] | Particle size d5% | Particle size d50% | Particle size d95% |
|---|---|---|---|---|---|---|---|
| K1 | inventive | untreated | 266 | 324 | 1.8 | 4.3 | 7.6 |
| K2 | inventive | treated | 207 | 312 | 1.8 | 4.0 | 7.9 |
| VG1 | Tosoh | untreated | 146 | 250 | 1.1 | 3.8 | 8.2 |
| VG2 | Tosoh | treated | 135 | 248 | 1.3 | 4.3 | 9.0 |

TABLE B

| Silica | Carbon content [%] | Tamped density [g/l] | Bulk density [g/l] | Drying loss 2 h/105° C. [%] |
|---|---|---|---|---|
| K1 | — | 78 | 67 | 4.6 |
| K2 | 3.4 | 70 | 62 | 5.1 |
| VG1 | <0.05 | 76 | 64 | 4.9 |
| VG2 | 0.32 | 80 | 68 | 4.3 |

TABLE C

| Silica | Average pore diameter (volume) [μm] | Cum. volume [ml/g] 0.1 μm-3.0 μm range | Cum. volume [ml/g] 0.1 μm-4.0 μm range | Cum. volume [ml/g] 0.1 μm-5.0 μm range |
|---|---|---|---|---|
| K1 | 2.7998 | 2.90 | 3.10 | 3.30 |
| K2 | 2.8353 | 2.70 | 2.90 | 3.00 |
| VG1 | 8.0332 | 2.20 | 2.35 | 2.55 |
| VG2 | 8.8739 | 2.20 | 2.40 | 2.50 |

Tables A-C show the physicochemical indices of the precipitated silicas according to the invention, and comparative silicas VG1 and VG2. K1 is an untreated precipitated silica according to the invention. K2 is a wax-treated precipitated silica according to the invention. Comparative examples VG1 and VG2 are Tosoh precipitated silicas with the trade names Nipsil E-1011 (with organic aftertreatment according to the datasheet) (VG2) and Nipsil E-220A (VG1). The average particle size of these commercially available precipitated silicas has a similar $d_{50}$ to K1 and K2. It is known that VG1 and VG2 are used as matting additives.

The inventive precipitated silicas K1 and K2 showed a much higher DOA value compared to VG1 and VG2 from Tosoh with comparable particle size distribution (see Table A).

It was possible to illustrate the specific porosity of the inventive silicas K1 and K2 by mercury porosimetry. The corresponding values are shown in Table C.

The inventive silicas K1 and K2 showed a very much smaller average pore diameter at approx. 2.8 μm than precipitated Nipsil E 1011 (VG2) at 8.9 and Nipsil E-220A (VG1) at 8.0 μm. Nevertheless, K1 and K2 were able to absorb more mercury within a pore range of 0.1-3.0 μm, 0.1-4.0 μm and also 0.1-5.0 μm. The higher number of smaller pores on average brings a crucial advantage in terms of transparency, particularly in the case of waterborne paint systems.

2. Production of Paint Systems

Various paint systems were produced for the paint tests.

2.1 Paint System 1: 2K PUR Paint (DD Paint)

The solvent-based 2K PUR paint was produced according to the details from Table 1.

TABLE 1

| Paint system 1 | | | |
|---|---|---|---|
| Item | Paint raw materials | Manufacturer | Pts. by wt. (g) |
| 1 | Butyl acetate 98% | STAUB & CO.-SILBERMANN GmbH | 11.0 |
| 2 | Ethoxypropyl acetate | Möller Chemie Gmbh & Co. KG | 16.5 |
| 3 | Desmophen 800 | Covestro AG | 15.0 |
| 4 | Desmophen 1100 | Covestro AG | 20.0 |
| 5 | CAB 381-0.5, 10% in butyl acetate 98% | Krahn Chemie GmbH | 3.0 |
| 6 | Mowilit, 50% in ethyl acetate | Celanese Emulsion GmbH | 0.3 |
| 7 | Baysilone paint additive | OMG Borchers GmbH | 0.1 |
| 8 | Xylene | Merck | 34.1 |
| | | Total | 100.0 |

The individual paint raw materials were weighed out stepwise in the above sequence and homogenized with a laboratory dissolver. Homogenization was necessary after each of positions 4, 5, 6 and 7. There was a final homogenization of the paint after position 8.

2.2 Paint System 2: 1 K PU Acrylate, Wb (Clearcoat)

The water-based 1 K PU acrylate paint was produced according to the details from Table 2.

TABLE 2

| Paint system 2 | | | |
|---|---|---|---|
| Item | Paint raw materials | Manufacturer | Pts. by wt. |
| 1 | Dispersion Urethane 2012 | Michelman | 85.0 |
| 2 | Butylglycol | Evonik | 6.0 |
| 3 | Water | — | 6.0 |
| 4 | Tego Foamex 805 | Evonik | 0.2 |
| 5 | BYK 346 | BYK | 0.3 |
| 6 | Tego Viscoplus 3010 | Evonik | 0.5 |
| 7 | Water | — | 2.0 |
| | | Total | 100 |

Adjustment of the pH with AMP 95 (2-amino-2-methyl-1-propanol, 95% in water, from Carl Roth GmbH + Co. KG)

A preliminary mixture 1 was produced from positions 2 and 3 with an adjustment of pH by addition of AMP 95 to 8.5-9.0. A preliminary mixture 2 was likewise produced from positions 6 and 7. Then position 1 was initially charged, and preliminary mixture 1 was added while stirring. After successive addition of positions 4 and 5, preliminary mixture 2 was added. Finally, the clearcoat was homogenized at 1500 rpm for 10 min and introduced into an airtight canister.

2.3 Paint System 3: 1K Acrylate, Wb (Clearcoat)

The water-based 1 K acrylate paint was produced according to the details from Table 3.

TABLE 3

| Paint system 3 | | | |
|---|---|---|---|
| Item | Paint raw materials | Raw material manufacturer | Pts. by wt. |
| 1 | Alberdingk AC 3630 | Alberdingk | 80.0 |
| 2 | Tego Foamex 805 | Evonik | 0.2 |
| 3 | Tego Wet 270 | Evonik | 0.3 |
| 4 | Water | — | 13.0 |
| 5 | Butylglycol | Evonik | 6.5 |
| | | Total | 100 |

Adjustment of the pH with AMP 95 (2-amino-2-methyl-1-propanol, 95% in water, from Carl Roth GmbH + Co. KG)

A preliminary mixture was produced from positions 4 and 5 with an adjustment of pH by addition of AMP 95 to 8.5-9.0. Position 1 was initially charged, and the preliminary mixture was added while stirring. After successive addition of positions 2 and 3, the clearcoat was homogenized at 1500 rpm for 10 min and introduced into an airtight canister.

3 Application of the Paint Systems and Evaluation of the Surface Properties 3.1 Incorporation of the Silica in the Paint Systems Paint System 1:

In accordance with the weights from Table 3.1, the silica was introduced into 100 parts by weight of the paint system 1 in a 350 ml PE cup. It was ensured here that the silica was properly incorporated and did not stick to the edge of the cup. Subsequently, the then matted paint system 1 was dispersed with a 4.2 cm paddle stirrer at 2000 rpm for 10 min.

Paint System 2:

95 parts by weight of paint system 2 and 5 parts by weight of Dowanol DPM (dipropylene glycol methyl ether, Dow Chemical) were mixed with stirring and stirred with a paddle stirrer at 1000 rpm for 5 min.

The appropriate weights of the silica according to Table 3.2 were incorporated in this mixture, except that the mixture was already being stirred continuously with the paddle stirrer on addition of the silica.

Paint System 3:

The silica was incorporated in accordance with the weights according to Table 3.3 in an analogous manner to paint system 2.

VG1 and VG2 were incorporated analogously in the respective paint systems and weights from Tables 3.1-3.3.

3.2 Application of the Matted Paint Systems and Evaluation of the Surface Properties After a deaeration phase of 30 min, the respective matted paint systems were drawn down onto black PMMA sheets with a Coatmaster 509 MC film applicator. For this purpose, a box-type coating bar with a gap height of 200 μm was used. The drawdown rate was set to 25 mm/s. The coated PMMA sheets were dried under climate-controlled conditions at 21-25 °C and a relative humidity of 40-60% overnight. The gloss level at 60° and the transparency of the dried matted surfaces was measured one day after application.

TABLE 3.1

Paint performance results for paint system 1

| Gloss at | Weight of matting agent [g/100 g] | | | | Transparency [Dy] | | | |
|---|---|---|---|---|---|---|---|---|
| 60° | K1 | K2 | VG1 | VG2 | K1 | K2 | VG1 | VG2 |
| 2 | 9.38 | 10.00 | 11.80 | 11.08 | 1.33 | 1.32 | 1.30 | 1.31 |
| 5 | 8.89 | 9.50 | 10.95 | 10.31 | 1.52 | 1.52 | 1.50 | 1.48 |
| 10 | 8.52 | 9.00 | 10.38 | 9.82 | 1.79 | 1.80 | 1.74 | 1.74 |
| 20 | 8.00 | 7.97 | 9.79 | 9.25 | 2.17 | 2.13 | 1.99 | 2.06 |

TABLE 3.2

Paint performance results for paint system 2

| Gloss at | Weight of matting agent [g/100 g] | | | | Transparency [Dy] | | | |
|---|---|---|---|---|---|---|---|---|
| 60° | K1 | K2 | VG1 | VG2 | K1 | K2 | VG1 | VG2 |
| 2 | 5.10 | 5.70 | 9.15 | 6.70 | 1.38 | 1.37 | 1.35 | 1.39 |
| 5 | 3.30 | 3.70 | 6.15 | 4.55 | 1.60 | 1.59 | 1.52 | 1.55 |
| 10 | 2.12 | 2.41 | 4.28 | 3.38 | 1.80 | 1.80 | 1.62 | 1.71 |
| 20 | 1.10 | 1.20 | 2.69 | 2.24 | 2.10 | 2.08 | 1.91 | 1.94 |

TABLE 3.3

Paint performance results for paint system 3

| Gloss at | Weight of matting agent [g/100 g] | | | | Transparency [Dy] | | | |
|---|---|---|---|---|---|---|---|---|
| 60° | K1 | K2 | VG1 | VG2 | K1 | K2 | VG1 | VG2 |
| 2 | 8.70 | 8.50 | 10.75 | 8.80 | 1.39 | 1.41 | 1.44 | 1.44 |
| 5 | 5.10 | 5.18 | 7.85 | 6.56 | 1.63 | 1.64 | 1.58 | 1.59 |
| 10 | 3.56 | 3.61 | 6.10 | 5.09 | 1.92 | 1.89 | 1.84 | 1.82 |
| 20 | 2.36 | 2.47 | 4.37 | 3.60 | 2.19 | 2.21 | 2.10 | 2.12 |

The three paint systems shown are representative of a multitude of standard binder systems where high-quality matted surfaces are desired. Aspects such as transparency and tactile properties in particular play an important role here in the matted coatings.

The inventive silicas K1 and K2, by comparison with the conventional precipitated silicas, showed higher efficiency (economic viability) in all three paint systems over the entire gloss range of 20 gloss points, measured at a 60° angle, down to the deep matt for 2 gloss values at the 60° angle. This means that, for attainment of the gloss levels shown in Tables 3.1-3.3, less silica had to be used than in the case of the conventional comparative silicas VG1 and VG2. Comparison of the efficiency makes sense only when the mutually compared silicas have a similar particle size distribution [see Table A (d5, d50 and d95)].

The inventive silicas K1 and K2 showed higher transparency values Dy compared to conventional silicas in the solvent-based paint system 1 over the gloss range from 20 to 2 gloss points at the 60° angle (Table 3.1). In the two aqueous paint systems 2 and 3 (Tables 3.2 and 3.3) as well, transparency values in the gloss range of 20 to 5 gloss units (60° angle) are higher across the board. It should be noted here that the transparencies of the matted clearcoat systems 1, 2 and 3 can be compared only when the gloss level is the same. Comparison with equal dosage of the matting agent is impermissible. The measured transparency value Dy is a logarithmic numerical value. Thus, the higher the Dy value, the more transparent the matted clearcoat.

For example, the precipitated untreated silica K1 in the 1 K acrylate paint system (paint system 3) has a Dy value of 2.19 at 20 gloss units (60° angle), whereas the untreated precipitate competitor silica Nipsil E-220A (VG1) has only a transparency value of 2.10. Thus, K1 has about a 23% higher transparency. The trained eye can visually perceive even differences in values of 0.03 ascertained by measurement.

Thus, this specific porosity of the inventive silicas K1 and K2 has a positive effect on efficiency and transparency in different coating systems.

4. Dispersion Characteristics According to the Grindometer Determination 100 g of DUPLEX D 1326 paint was weighed into a 350 ml polyethylene cup and 20 g of V 0003 thinner was weighed in. Then the amount of silicas specified in Table 4 was weighed in and incorporated cautiously into the thinned test paint with a spatula. Thereafter, the mixture was dispersed at 2000 rpm with a paddle stirrer, Ø 43 mm, for 10 min, while covering the PE cup to avoid evaporation losses. After the silica has been incorporated, the matted paint was left to stand in the closed beaker for deaeration for 30 min.

In order to assure comparability of the different silicas, Duplex D 1326 black paint was adjusted in each case with the matting agents listed in Tab. 4 to a gloss level of 20 gloss units (±0.1), measured at the 60° angle.

The adjustment of the gloss level was examined as follows:

On completion of deaeration, the paint was applied with a motorized drawdown device (Erichsen Coatmaster 509 MC) to cleaned glass panes (130×90×3 mm) at a speed of 25 mm/s using a square coating bar with gap height 120 μm. The square coating bar is weighed down with a block of VA steel (dimensions: 71×30×24 mm, weight: about 420 g) to increase the applied load. Each dispersed sample is to coat 2 glass panes. The paint applied is flashed off using the fixed flash-off conditions:

Temperature: 20 °C to 25 °C.

Relative humidity: 40% to 60%

Flash-off time: 10 min to 20 min

The paint was then baked in a recirculating paint drying cabinet at 150 °C for 20 min. The reflectometer values were measured by BYK haze gloss after the glass panes had cooled down (at least 30 minutes). The reflectometer value was formed from the average of the duplicate determination.

FIG. 2 shows a grindometer image of K1 and K2

FIG. 3 shows a grindometer image of VG1 and VG2

TABLE 4

| Evaluation of grindometer images | K1 [FIG. 2] | K2 [FIG. 2] | VG1 [FIG. 3] | VG2 [FIG. 3] |
|---|---|---|---|---|
| Weight of silica in Black Duplex D 1326 test paint [g] (20 gloss units/60°) | 5.90 | 6.25 | 6.85 | 6.55 |
| D50 [um] | 4.3 | 4.0 | 3.8 | 4.3 |
| Grindometer value [μm] | 15 | 15 | 18 | 18 |
| Number of specks | 0 | 0 | 5 | 4 |
| Specks up to [μm] | — | — | 63 | 57 |

The grindometer images shown in FIGS. 2 and 3 for the inventive silicas K1 and K2 show a lower value by 3 μm than in the case of the comparative silicas VG1 and VG2. This is also associated with the lower d95% values from Table A, since the grindometer value is determined to a crucial degree by the coarser component of the grain collective. As in the case of the clearcoat systems 1, 2 and 3 shown above, the silicas according to the invention also showed higher efficiency in the black-pigmented Duplex D 1326 test paint since less matting agent had to be weighed in to establish a gloss level of 20, measured at a 60° angle. It is also noticeable that K1 and K2 in FIG. 2 have a much smaller transition range and no specks at all. In the case of many precipitated silicas with d50 values of less than 5 μm, the silica particles have a tendency to re-agglomerate during storage, which can be recognized by an increasing number of specks in the grindometer image over time. Usually, the tendency of untreated silicas to be agglomerated higher than in the case of those having organic coverage of the surface. This may already be the case after a few days in the case of silicas having a high tendency to reagglomerate, or only after weeks or months in the case of higher stability. In the case of the inventive silicas K1 and K2, by contrast, this was not observed, and hence confirms the very low tendency to speck formation. It is assumed that the specific morphology and pore distribution of silicas K1 and K2 not only has an advantageous effect on dispersibility, but also results in high stability to reagglomeration.

The invention claimed is:

1. A precipitated silica, wherein a BET is from 150 $m^2/g$-400 $m^2/g$, determined to ISO 9277; a DOA is from 220 ml/100 g-400 ml/100 g, determined to ISO 19246; a $d_{50}$ is from 3.0 μm-5.0 μm, determined by laser diffraction according to ISO 13320; a particle size ratio $d_5:d_{50}:d_{95}$ is >0.3:1:<2; and a particle size distribution $d_{95}-d_5$ is between 1.3 and 1.7 $d_{50}$.

2. The precipitated silica according to claim 1, wherein a median pore diameter is less than 7.0 μm, measured according to ISO 15901-1, with the following instrument settings: contact angle of 140° and pressure range of 0.003-420 MPa, calculated in a pore diameter range of 3.5 nm-500 μm.

3. The precipitated silica according to claim 1, wherein a pore volume is greater than 2.40 ml/g (d=0.1 μm–d=4.0 μm)–3.10 ml/g (d=0.1 μm–d=4.0 μm), determined by means of the Hg porosimeter.

4. The precipitated silica according to claim 1, wherein a pore volume is greater than 2.50 ml/g (d=0.1 μm–d=5.0 μm)–3.30 ml/g (d=0.1 μm–d=5.0 μm), determined by means of the Hg porosimeter.

5. The precipitated silica according to claim 1, wherein the $d_{50}$ is 3.5-4.5 μm.

6. A composition, comprising:

a matting agent comprising the precipitated silica according to claim 1, wherein the composition is selected from the group consisting of dispersions, millbases, paints, coatings or printing inks, inkjet inks, grind resins, pigment concentrates, colour preparations, pigment preparations, filler preparations and coating compositions.

7. A wax-coated precipitated silica, wherein a BET is from 150 $m^2/g$-400 $m^2/g$, measured to ISO 9277; a DOA is from 220 ml/100 g-400 ml/100 g, measured to ISO 19246; a $d_{50}$ is from 3.0 μm-5.0 μm, measured by laser diffraction according to ISO 13320; a particle size ratio $d_5:d_{50}:d_{95}$ is >0.3:1:<2; a particle size distribution $d_{95}-d_5$ is between 1.3 and 1.7; and $d_{50}$ a carbon content is 1.0-6.0% by weight, measured according to ISO 3262-19.

8. A composition, comprising:

a matting agent comprising the wax-coated precipitated silica according to claim 7, wherein the composition is selected from the group consisting of dispersions, millbases, paints, coatings or printing inks, inkjet inks, grind resins, pigment concentrates, colour preparations, pigment preparations, filler preparations and coating compositions.

9. The precipitated silica according to claim 1, wherein the BET is from 200 $m^2/g$-300 $m^2/g$.

10. The precipitated silica according to claim 1, wherein the DOA is from 250 ml/100 g-350 ml/100 g.

11. The precipitated silica according to claim 2, wherein the median pore diameter is less than 5.0 μm.

12. The precipitated silica according to claim 2, wherein the median pore diameter is less than 3.0 μm.

13. The wax-coated precipitated silica according to claim 7, wherein the BET is from 200 $m^2/g$-300 $m^2/g$.

14. The wax-coated precipitated silica according to claim 7, wherein the DOA is from 250 ml/100 g-350 ml/100 g.

15. The wax-coated precipitated silica according to claim 7, wherein the carbon content is 2.4-3.8% by weight.

* * * * *